(12) United States Patent
Ho et al.

(10) Patent No.: US 6,512,502 B2
(45) Date of Patent: *Jan. 28, 2003

(54) LIGHTVALVE PROJECTION SYSTEM IN WHICH RED, GREEN, AND BLUE IMAGE SUBPIXELS ARE PROJECTED FROM TWO LIGHTVALVES AND RECOMBINED USING TOTAL REFLECTION PRISMS

(75) Inventors: Kenneth C. Ho, Yonkers; Alan Edward Rosenbluth, Yorktown Heights, both of NY (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/085,065

(22) Filed: May 27, 1998

(65) Prior Publication Data

US 2002/0000958 A1 Jan. 3, 2002

(51) Int. Cl.⁷ ................................................. G09G 3/34
(52) U.S. Cl. .......................................... 345/84; 348/750
(58) Field of Search ............................. 345/88, 87, 84, 345/589, 694, 690; 348/84, 744, 750–751, 759–761

(56) References Cited

U.S. PATENT DOCUMENTS

| 5,517,340 A | 5/1996 | Doany et al. | 359/41 |
| 5,555,035 A * | 9/1996 | Mead et al. | 348/757 |
| 5,767,924 A * | 6/1998 | Hiroki et al. | 349/5 |
| 5,808,797 A * | 9/1998 | Bloom | 359/572 |
| 5,875,006 A * | 2/1999 | Nagae et al. | 348/751 |
| 5,892,497 A * | 4/1999 | Robertson | 345/107 |
| 5,900,982 A * | 5/1999 | Dolgoff et al. | 359/619 |

* cited by examiner

Primary Examiner—Bipin Shalwala
Assistant Examiner—Vanel Frenel
(74) Attorney, Agent, or Firm—Scully, Scott, Murphy & Presser; Daniel P. Morris, Esq.

(57) ABSTRACT

A projection display for displaying a color image formed of a plurality of color pixels. Each color pixel has a combination of different color light components. The display has a light source for supplying light to an optical path. A projection lens is disposed in the optical path, as are first and second light valves. The first and second light valves each have a plurality of subpixels. Each subpixel has an associated color filter for reflecting a corresponding color light component. The sub-pixels are grouped into groups of three, each group has a single sub-pixel from one of the first or second light valves and the remaining two sub-pixels from the other light valve, which together combine to form a color pixel of the color image for each of the color pixels of the color image. Lastly, directing means are provided for directing the light from the light source to the first and second light valves and for directing the respective color light components reflected from the light valves towards the projection lens which projects and magnifies the color pixels onto a screen thereby forming the color image.

26 Claims, 12 Drawing Sheets

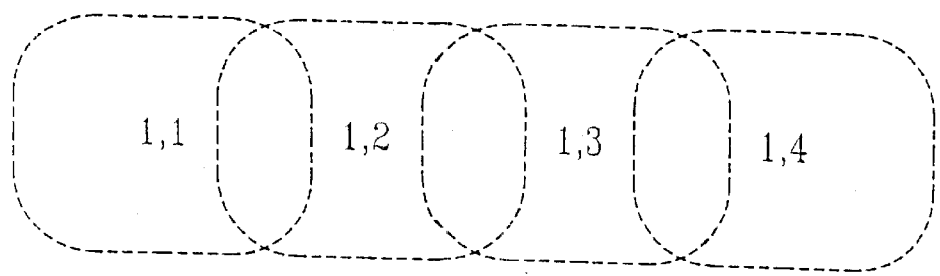

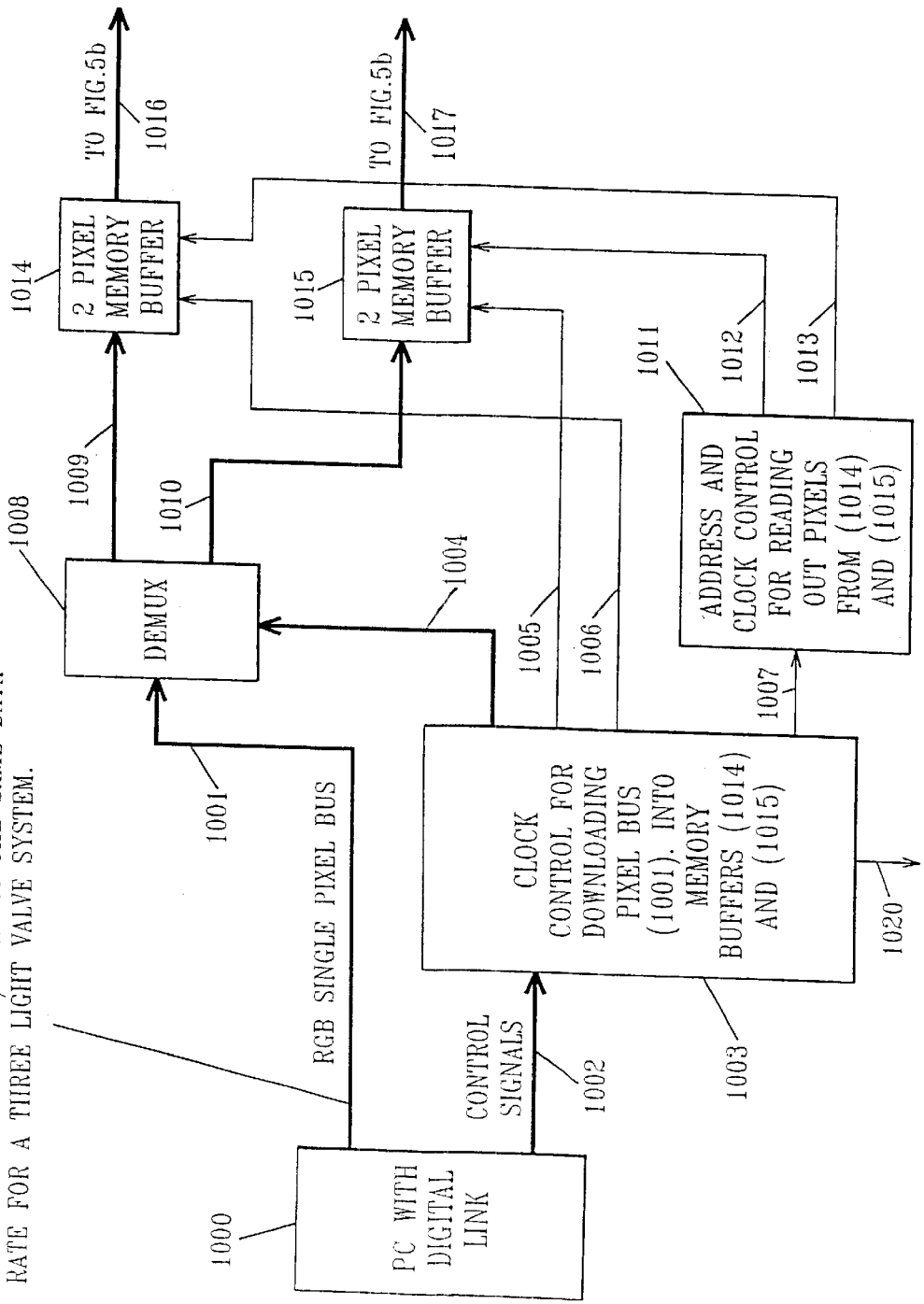

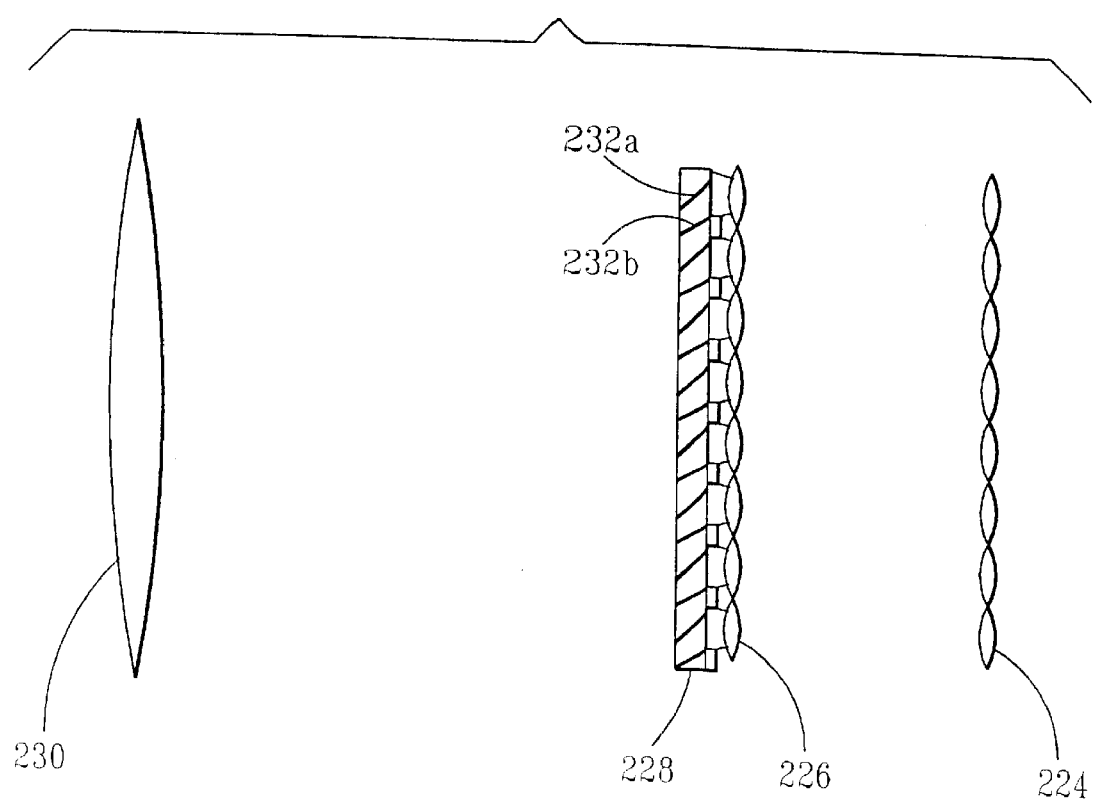

FIG. 9

| Layer | Thickness (nm) |
|---|---|
| Air | |
| $SiO_2$ | 104.74 |
| $TiO_2$ | 86.3 |
| $SiO_2$ | 62.07 |
| $TiO_2$ | 10.6 |
| $SiO_2$ | 92.95 |
| $TiO_2$ | 109.61 |
| $SiO_2$ | 43.06 |
| $TiO_2$ | 20.71 |
| $SiO_2$ | 28.13 |
| $TiO_2$ | 107.89 |
| $SiO_2$ | 39.65 |
| $TiO_2$ | 24.25 |
| $SiO_2$ | 36.2 |
| $TiO_2$ | 221.89 |
| $SiO_2$ | 46.09 |
| $TiO_2$ | 14.73 |
| $SiO_2$ | 72.54 |
| $TiO_2$ | 15.7 |
| $SiO_2$ | 20.26 |
| $TiO_2$ | 107.86 |
| $SiO_2$ | 39.01 |
| $TiO_2$ | 13.57 |
| Glass | |

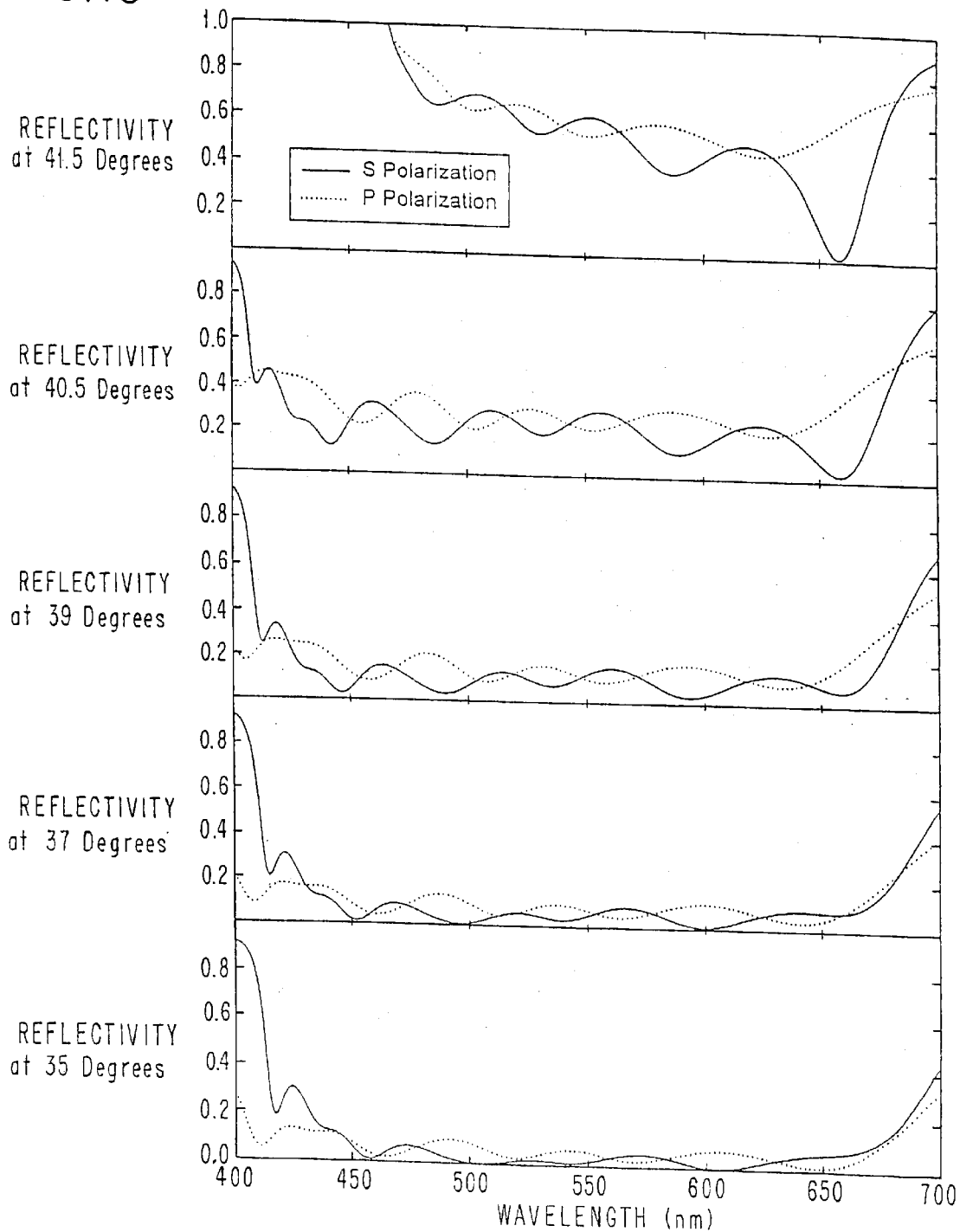

LIGHTVALVE PROJECTION SYSTEM IN WHICH RED, GREEN, AND BLUE IMAGE SUBPIXELS ARE PROJECTED FROM TWO LIGHTVALVES AND RECOMBINED USING TOTAL REFLECTION PRISMS

BACKGROUND OF THE INVENTION

1. Field of the Invention

This invention is directed to lightvalve optical projection displays in which each pixel of the displayed image is formed from red, green, and blue subpixels, and more particularly to projectors using two such lightvalves to avoid the difficulty of fabricating all subpixels together in a single lightvalve, while also avoiding the complex optical systems required when the subpixels are divided between three lightvalves (red, green, and blue).

2. Discussion of the Prior Art

Many low cost data projectors make use of lightvalves in which each pixel in the screen image is formed from adjacent red, green, and blue (R,G,B) subpixels. Each lightvalve R,G,B subpixel is driven with the corresponding color component of the image pixel. A patterned color filter ensures that the illuminating light modulated by each subpixel is of the appropriate color.

An advantage of these systems is that they avoid the complexity of the color separating and recombining optics that are needed in projectors with separate lightvalves for R, G, and B. A disadvantage is that the lightvalve must incorporate at least 3 addressable pixel elements for each individual image element.

Generally there is a direct yield impact from the increased number of pixel elements. Moreover, in a given lightvalve technology there is usually some minimum practical pixel size [for acceptable image brightness, as well as for feasibility of fabrication], and the cost/yield implications of the 3× area increase needed to amalgamate all R,G,B subpixels into one lightvalve is quite significant, even when the subpixels are of minimum size. If the lightvalve image pixel count, denoted P, is near the state of the art, the cost of a single lightvalve with 3P subpixels is often considerably larger than that of 3 lightvalves with P pixels each. The patterned filter approach therefore tends to be adopted only at the low end of the market; for example in VGA (307,200 image pixels) or SVGA (480,000 image pixels) projectors at a time when more expensive 3-panel displays project XGA images (786,432 pixels).

In the case of color sequential lightvalve displays there are known arrangements that project two lightvalves with optical systems whose complexity is only slightly greater than that needed to project a single lightvalve. For example, Texas Instruments markets optical projection engines incorporating two DMD lightvalves, where one lightvalve is operated in a color sequential mode while the second projects red light only. This arrangement compensates the red deficient output of many short arc lamps. Another example is U.S. Pat. No. 5,517,340, to Doany et al., employing two sequentially-addressed lightvalves in order to ease the fast switching speed required when a single lightvalve must sequentially project all three colors.

For projectors employing lightvalves with patterned color filters, what is needed is a way to reduce the number of subpixels on the lightvalves while avoiding the complex optical systems used in projectors incorporating three lightvalves.

SUMMARY OF THE INVENTION

Therefore, it is an object of the present invention to provide a projection display in which the complex optical systems used in projectors incorporating three lightvalves is avoided.

It is yet another object of the present invention to provide a projection display in which the expensive optical systems used in projectors incorporating three lightvalves is avoided.

Accordingly, a lightvalve projection system is provided in which the R,G,B color content of the image is divided between two lightvalves, so that each lightvalve need contain only a 1.5× increased number of subpixels, instead of the 3X increase needed in the conventional one-LV approach. The projection display incorporates an optical system using TIR prisms that can project two lightvalves at little greater cost than a single lightvalve [because no external dichroic filtering is required], making the invention suitable for the low-end market where the patterned filter approach is popular. The incoming data stream can be suitably divided between the two light valves by buffering the input R,G,B data stream in groups of 6 subpixel data values; it is not necessary to buffer entire subframes. The active layer response time required in the Light valves is the same as in conventional 3-LV configurations.

More specifically, disclosed herein is a projection display for displaying a color image formed of a plurality of color pixels. Each color pixel comprises a combination of different color light components. The display comprises a light source for supplying light to an optical path. A projection lens is disposed in the optical path, as are first and second light valves. The first and second light valves each have a plurality of subpixels. Each subpixel has an associated color filter for reflecting a corresponding color light component. The sub-pixels are grouped into groups of three, each group comprising a single sub-pixel from one of the first or second light valves and the remaining two sub-pixels from the other light valve, which together combine to form a color pixel of the color image for each of the color pixels of the color image. Lastly, directing means are provided for directing the light from the light source to the first and second light valves and for directing the respective color light components reflected from the light valves towards the projection lens which projects and magnifies the color pixels onto a screen thereby forming the color image.

Also provided is a method for displaying a color image with the projection display of the present invention. The method comprises a first step of supplying light from the light source. In a second step, the light is directed by means of the directing means towards the first and second light valves. In a third step, the respective color light components reflected from the light valves are directed by means of the directing means towards the projection lens. In a fourth step, each color light component of the single sub-pixel is projected and magnified onto the screen. In a fifth step, the color light components of each of the remaining two sub-pixels are simultaneously projected and magnified onto the screen to combine each single sub-pixel with its corresponding remaining two sub-pixels to form the color pixels of the color image.

BRIEF DESCRIPTION OF THE DRAWINGS

Further features and advantages of the invention will become more readily apparent from a consideration of the following detailed description set forth with reference to the accompanying drawings, which specify and show preferred embodiments of the invention, wherein like elements are designated by identical references throughout the drawings; and in which:

FIG. 1A illustrates the sub-pixels of a first row of a first lightvalve used in the display of the present invention.

FIG. 1B illustrates the sub-pixels of a first row of a second lightvalve used in the display of the present invention.

FIG. 1C illustrates the corresponding image pixels that are formed when the sub-pixels of FIGS. 1A and 1B are superimposed on the projection screen by the optical system of the present invention.

FIGS. 5A and 5B illustrate a schematic of a preferred firmware architecture for supplying sub-pixel data to the first and second lightvalves.

FIG. 7B illustrates a variation of the illumination system of FIG. 7A.

FIG. 9 illustrates a table of values for thickness and types of total internal reflection prisms of FIG. 8.

FIG. 10 illustrates a series of graphs showing the reflectance of the total internal reflectance prisms at various incidence angles.

DETAILED DESCRIPTION OF THE INVENTION

FIGS. 1A–1C explain the way in which the R,G,B content of a color image which is to be projected onto a screen, or any surface serving as a screen, is divided between the two lightvalves of the invention. FIG. 1A shows the first six subpixels in the top row of the first lightvalve. FIG. 1B shows the first six subpixels columns in the top row of the second lightvalve. FIG. 1C shows the corresponding image pixels that are formed when the subpixels on the two lightvalves of FIGS. 1A and 1B are superimposed on the projection screen by the optical system.

Lightvalve 2 is positioned with a one-half subpixel horizontal shift relative to lightvalve 1.

Figure 2A:
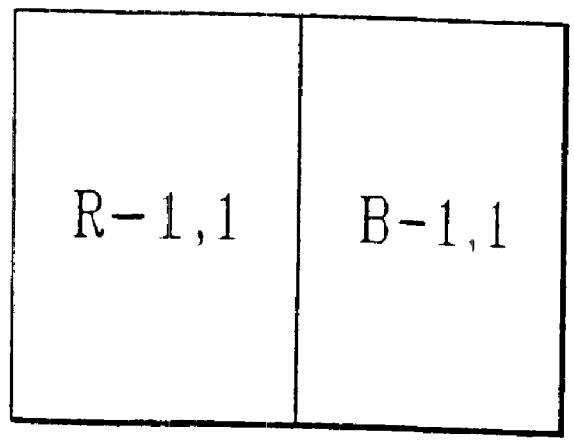
FIGS. 2A and 2B illustrate a first grouping of three sub-pixels, red, blue, and green, respectively, from the first and second lightvalves.
Figure 2B:
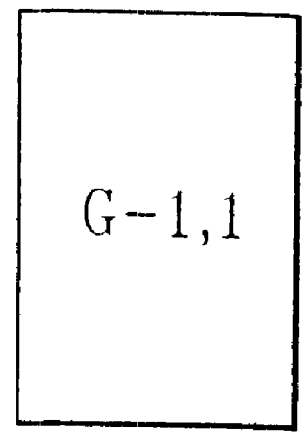
Figure 2C:
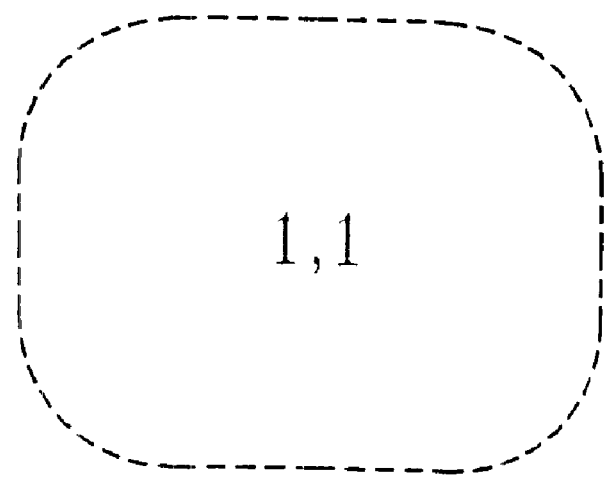
FIG. 2C illustrates the image pixel formed by the superposition of the first group of sub-pixels of FIGS. 2A and 2B.

This layout is further explained with reference to FIGS. 2A–2C and 3A–3C. FIGS. 2A–2C show only the pixel and subpixel entities of FIGS. 1A and 1B that involve the screen pixel in row #1, column #1 of the image. As in FIGS. 1A–1C, the first character in the label given to each subpixel refers to its color content (R for red, G for green, or B for blue), the second character refers to the row number of the image pixel, and the final character to the column number of the image pixel. Therefore R-1,1 refers to the red sub-pixel of the pixel of the first row and first column of the image. When combined with B-1,1 and G-1,1, the three sub-pixels form the image pixel of the first row and first column of the image, denoted as 1,1.

The subpixels of the invention are preferably rectangular in shape and have an aspect ratio of 1.5:1., meaning their height (their dimension in the column direction) is 1.5 times their width (their dimension in the row direction). FIG. 2A shows that the R and B subpixels of image pixel 1,1 are adjacent to each another on chip 1. FIG. 2B shows that the G subpixel of image pixel 1,1 resides on chip 2. In FIG. 2C the screen pixel formed by the superposed images of the three subpixels is given a rounded shape in order to denote the slight blurring imposed by the projection optics. As in prior art single lightvalve projectors that use adjacent R,G,B subpixels, the green light preferably falls mainly in the center of the image pixel, the red light on one edge [the left edge in this case], and the blue light on the other [the right edge]. However, because the optical system in the present invention effects a true superposition of the G subpixel with the R, B subpixel pair, the lateral spread in the colors is less, allowing the subpixel width in the present invention to be kept at ⅔ the subpixel height, instead of ⅓ the height as in the prior art.

Note that for simplicity, the final image pixels are assumed to have an equal horizontal and vertical pitch. As FIG. 1C shows, the image blur is larger in the horizontal direction than the vertical (in the ratio 2:1.5=1.33:1); nonetheless, as discussed below, the screen image has equal horizontal and vertical pitch.

Figure 3A:
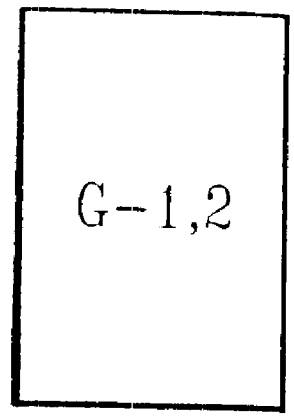
FIGS. 3A and 3B illustrate a second grouping of three sub-pixels, green, red, and blue, respectively, from the first and second lightvalves.
Figure 3B:
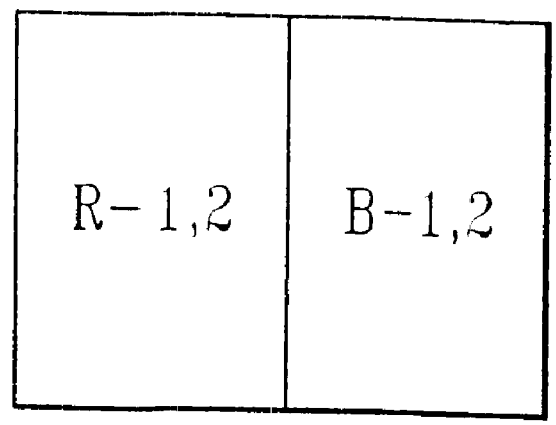
Figure 3C:
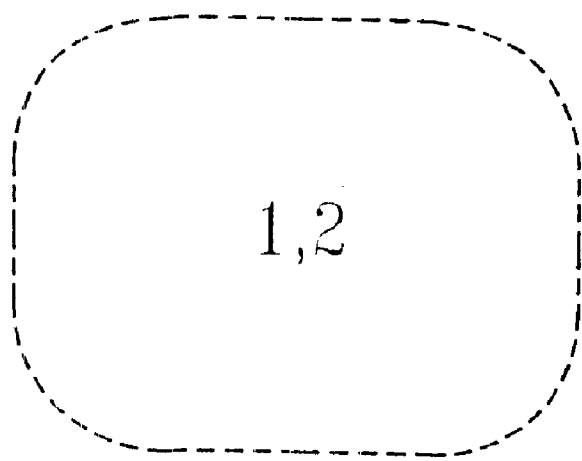
FIG. 3C illustrates the image pixel formed by the superposition of the second group of sub-pixels of FIGS. 3A and 3B.

Referring now to FIGS. 3A–3C there is illustrated the R,G,B subpixels associated with the image pixel in column 2 of row 1 of the image. In this case the G subpixel resides on lightvalve 1 and the R and B subpixels on lightvalve 2. Considering FIGS. 2A–2C and 3A–3C together, column pixels 1 and 2 of the screen image are thus formed from a superposition of the first 3 subpixel columns in lightvalve 1 and lightvalve 2. This pattern is repeated in all subsequent columns. The 3P subpixels that form the screen image are evenly divided between lightvalves 1 and 2.

Thus, a lightvalve technology that can support SXGA resolution [1280×1024=1,310,720 screen pixels] in a 3-lightvalve projector could also support HDTV resolution [chosen for this example as 1280×720=(1,382,400/1.5) screen pixels] in a low cost projector according to the present invention. Under the same conditions a prior art single-lightvalve projector would be limited to approximately SVGA resolution [800×600=(1,440,000/3) screen pixels].

Figure 4:
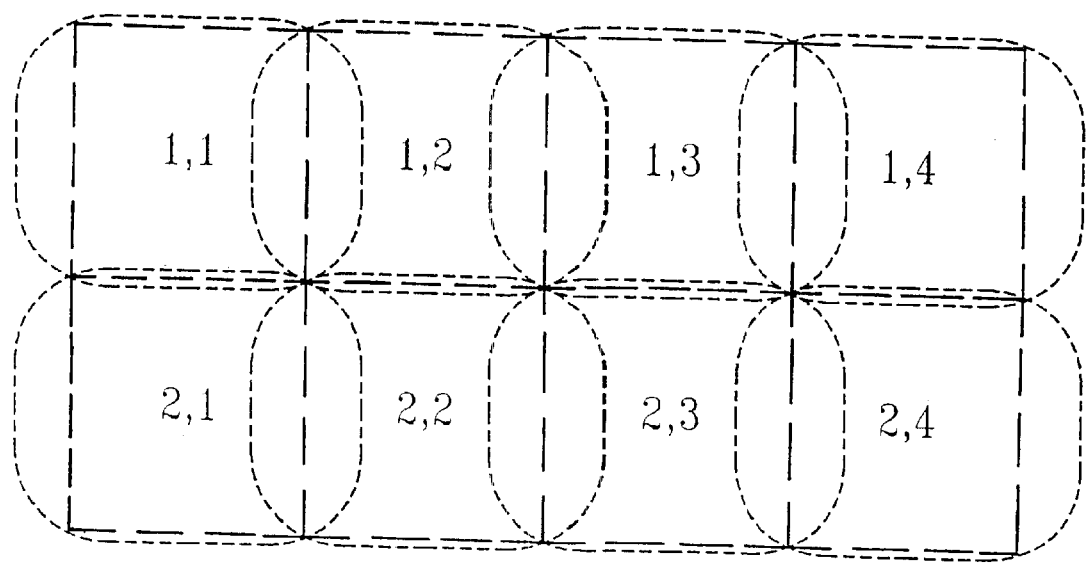
FIG. 4 illustrates superposition of the first row of sub-pixels of FIG. 1A with the sub-pixels of the first row of the sub-pixels of FIG. 1B together with the superposition of a second row of sub-pixels of the first lightvalve with a second row of sub-pixels of the second lightvalve.

FIG. 4 shows the screen image of FIG. 1C, along with the adjacent pixels in the second row of the screen image. FIG. 4C shows that the 1.33:1 aspect ratio subtended by the perimeter of individual pixels manifests itself as a horizontal blurring rather than an unequal pitch. Such a ⅓ pixel-width blurring is acceptable in subpixelated projectors; in fact, such blurring is often deliberately introduced in the prior art projectors in order to better merge the R,G,B subpixel images.

Figure 5B:
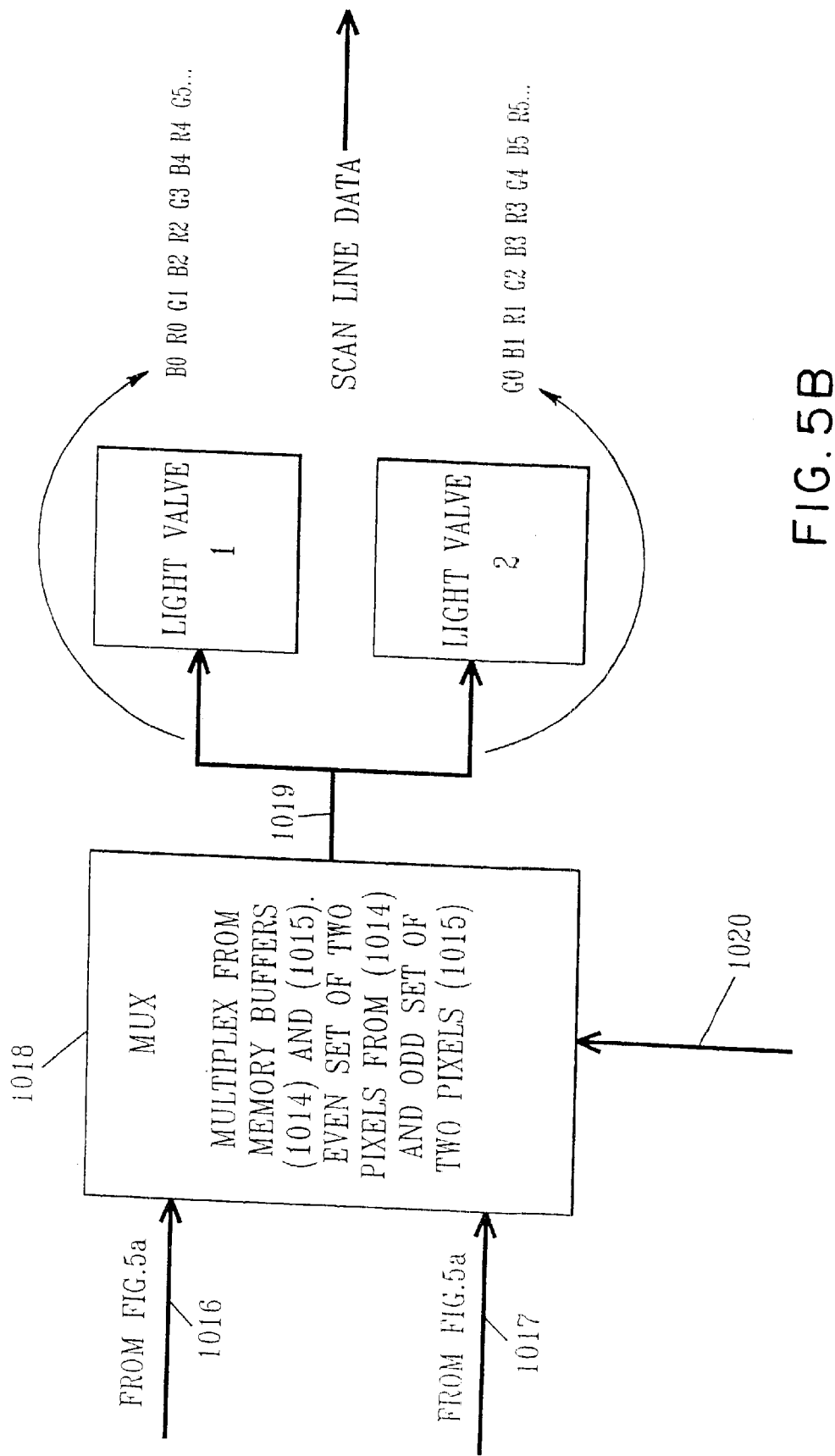

Referring now to FIGS. 5a and 5b, in a preferred embodiment of the present invention, sub-pixel data is distributed between lightvalves 1 and 2 by buffering subpixel data from two pixels at a time, thus, large frame memories are not needed. PC 1000 FIG. 29 illustrates a scraplog information screen including a select device listbox and a select reason window generates data for displayed images in standard fashion (pixel bus data path 1001). Image data in 1001 comprises triplets of RGB subpixel values, each pixel RGB triplet being transmitted during one pixel clock cycle. PC 1000 also generates control signals 1002 comprising clocks, hsync, vsync and frame sync. Clock control module 1003 controls demux module 1008 through control signal 1004. Signal 1004 controls demultiplexing of pixel bus data 1001 via demux 1008. During a first pair of pixel clock cycles, two successive RGB triplets are redirected by 1004 from RGB pixel bus 1001 to demultiplexed pixel stream 1009, these subpixel intensities are denoted R0,G0,B0; R1,G1,B1. During the second pair of clock cycles, two further RGB triplets (denoted R2,G2,B2; R3,G3,B3) from RGB pixel bus 1001 are redirected by 1004 to a second demux 1010.

The first two RGB triplets (R0,G0,B0; R1,G1,B1) derived from demux 1009 are stored in memory buffer 1014 during said first pair of successive clock cycles where they are clocked into 1014 by control signal 1006. Similarly, during said second pair of clock cycles the second pair of RGB triplets derived from demux 1010 (R2,G2,B2; R3,G3,B3) are stored in a second memory buffer 1015. During a third pair of clock cycles, 1004 again redirects two additional RGB triplets from 1001 to 1009, and reloads memory buffer 1014 with these triplets. At the same time (during said third pair of pixel clock cycles) memory buffer pixel stream 1017 is clocked out by control signal 1012 (derived from address-and-clock generator 1011). Module 1011 derives control signals 1012 and 1013 from signal 1007, which is generated by clock control module 1003. During the fourth pair of clock cycles, 1004 again redirects two additional RGB triplets from 1001 through demux 1008 to demux 1010 and reloads memory buffer 1015 with the two RGB triplets. At the same time memory buffer pixel stream 1016 is clocked out by control signal 1013 derived from address-and-clock generator 1011.

In this way data storage alternates between memory buffers 1014 and 1015 during successive pairs of pixel times; readout likewise alternates between buffers 1014 and 1015. Multiplexer 1018 is controlled by control signal 1020 derived from clock control module 1003. Control signal 1020 redirects memory buffer pixel streams 1016 and 1017 to light valve data bus 1019. Pixel data is loaded into light valve 1 at the output of light valve data bus 1019, in the order B0,R0,G1 . . . , and into light valve 2 in the order G0,B1,R1,G2 . . . .

Figure 6:
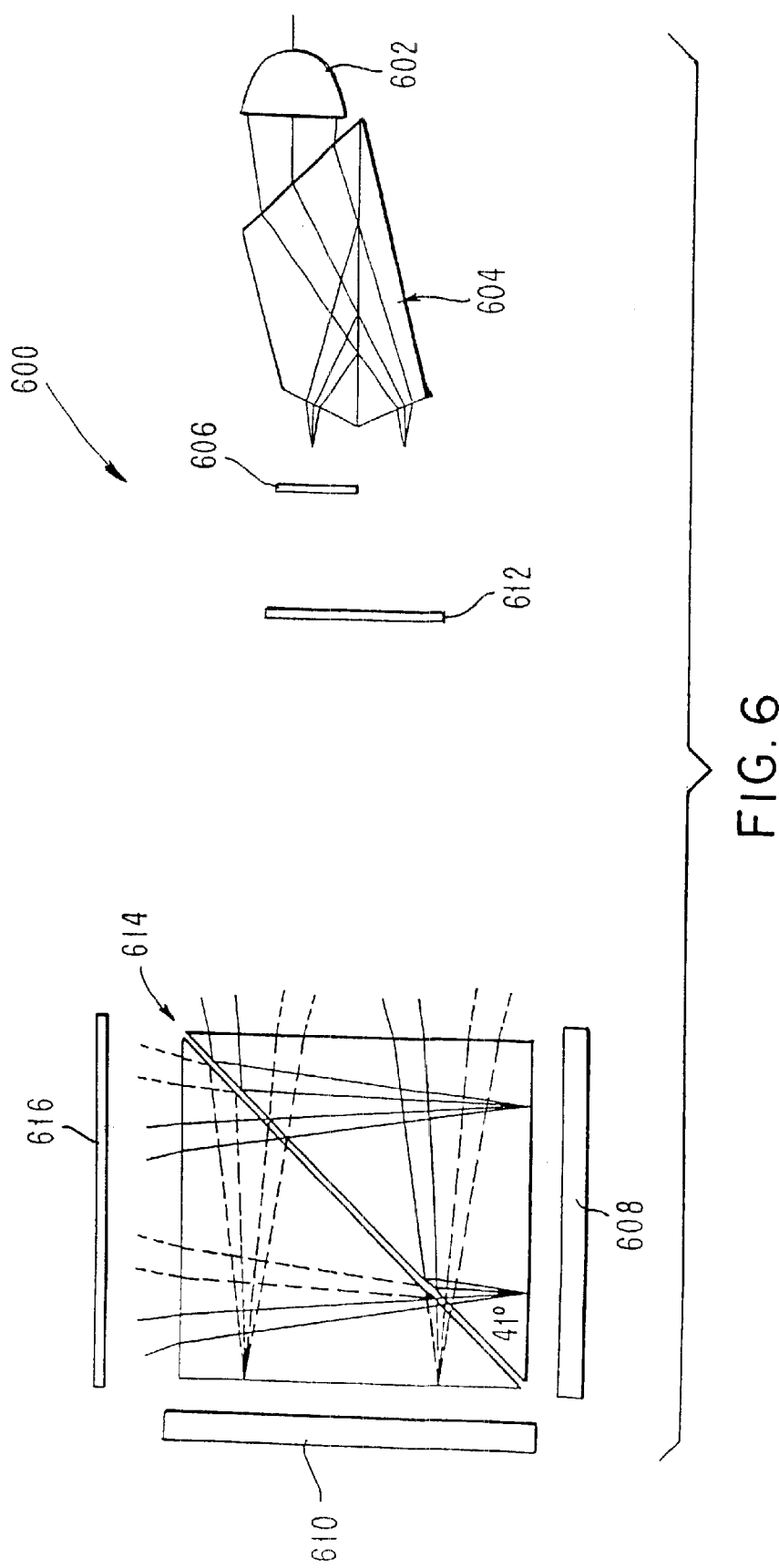
FIG. 6 illustrates a preferred embodiment of the optical system of the projection display of the present invention.

Referring now to FIG. 6, a preferred embodiment of the optical system 600 employed in the projection display of the present invention is summarized. The illumination system shown in FIG. 6 is appropriate to reflective lightvalves that use polarization modulation. A lamp source 602 emits unpolarized light; the projector preferably makes use of polarization conversion to use as much as possible of both polarizations. The two input polarizations are separated by a polarization beamsplitter (PBS) prism system 604 immediately to the left of the lamp.

One of the two polarizations output from the PBS is converted to the same polarization state as the other using a λ/2 retarder 606 (preferably an achromatic or 0-order retarder). Two or more condenser lenses (not shown) relay the focused images of the arc to the pupil (at infinity if the projection lens is telecentric), while also relaying an intermediate plane to a field stop conjugate (or coincident) with two lightvalves 608, 610. Before the illumination reaches the lightvalves 608, 610 it can be passed through a cleanup sheet polarizer 612 in order to ensure high contrast.

To reduce cost, a prism arrangement 614 based on Total Internal Reflection (TIR) is used in place of a PBS for directing the illumination and image light to and from the lightvalves 608, 610. The total reflection process bifurcates the pupil of the system, but this truncation can be made to partly coincide with the truncation aperture that is needed to implement polarization recycling [where each polarization can be allotted only one half of the optical system etendue in order to make room for the other polarization]. The net result of this truncation is usually an increase in collected light, since beam inhomogeneity typically causes the light loss from the 2× etendue reduction to be less than the 2× light increase arising from use of both polarizations. This beneficial inhomogeneity is often increased by focussing the arc image at the truncation plane. In the present invention this is accomplished by focussing the arc image in the plane of the pupil. Though the beamsplitter truncation aperture has a shape which differs in detail from that of the pupil, the two apertures should be made approximately coincident. If identical in shape, the TIR prism 614 would impose no extra loss.

Figure 7A:
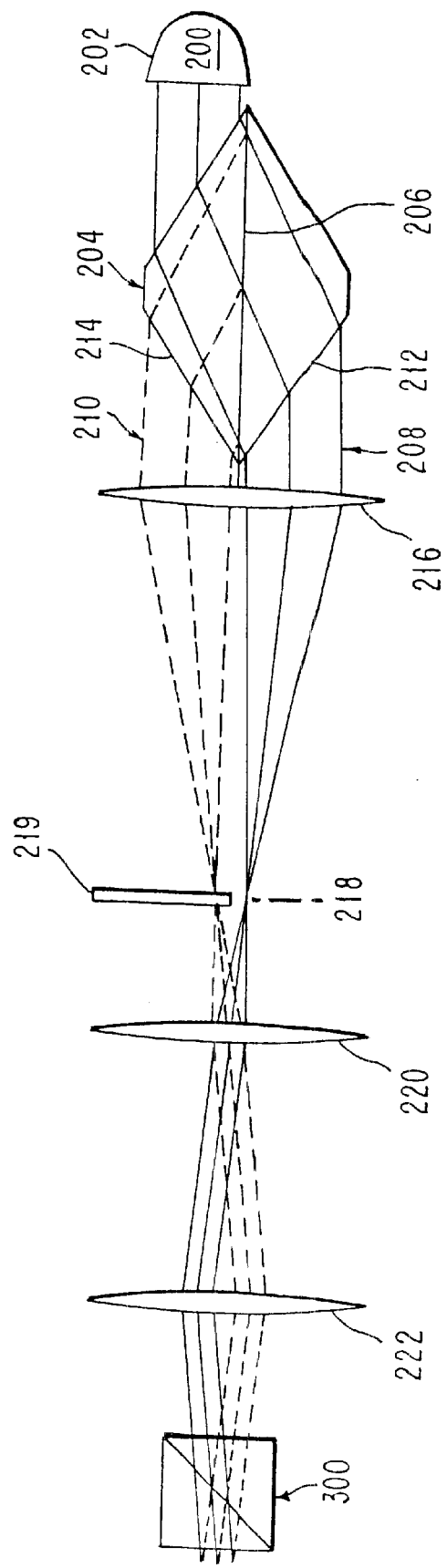
FIG. 7A illustrates the illumination system of FIG. 6 in greater detail.

Referring now to FIG. 7A, there is illustrated the illuminator layout of FIG. 6 in more detail. Light from lamp 200 inside reflector 202 is incident at PBS 204. Polarizing coating 206 transmits P polarized beam 208 and reflects S polarized beam 210. The tilt in PBS exit faces 212 and 214 causes beams 208 and 210 to be output in slightly different directions, in order that they be focused by lens 216 into offset positions in a plane 218 that is conjugate with the system aperture stop. The offset is chosen so that beams 208 and 210 are focused at fractional heights within the pupil of approximately 0.25 and 0.75 respectively. A half-wave retarder 220 converts beam 210 to P polarization, matching that of beam 208. Lenses 220 and 222 then recollimate beams 208 and 210 and reconverge them through TIR prism 300 onto lightvalves 1 and 2.

An alternative embodiment is shown in FIG. 7B. PBS 204 and lens 216 of FIG. 7a are replaced in FIG. 7B by an appropriate fly's-eye lens pair 224 and 226, polarization conversion system (PCS) 228, and condenser lens 230, all of which are well known in the art. Successive internal faces 232a, 232b within the PCS 228 are given an alternating tilt in order to produce the same non-parallelism in beams 208 and 210 as is produced by faces 212 and 214 of PBS 204 in FIG. 7A.

The doubled illumination beam is incident at TIR prisms 300 with a range of angles that is chosen to bracket the critical angle of the tilted prism hypotenuse faces adjacent to the air gap. To a first approximation the prism base angle is chosen such that the angle between the hypotenuse normal and the central axis of the directional cone of rays illuminating the lightvalve is equal to the critical angle. The critical angle is given by the following formula:

$$\theta_{crit} = \arcsin(1/n) \tag{1}$$

where n is the refractive index of the prism. The prism base angles should be cut at the same angle as the angle of incidence of the central ray, in order that the illumination and collection beams not be tilted through the prisms. A cheap glass with low refractive index (and low dispersion) is chosen, by way of example in FIG. 6, such as K10 glass, in order to produce prism angles close to 45°.

Rays incident at more glancing angles to the surface than the critical angle are completely reflected. (this is the phenomenon of total internal reflection). To the extent possible, the anti-reflection (AR) coating on the hypotenuse faces of TIR prisms 300 is designed to cause rays incident at angles steeper to the surface than critical to be almost entirely transmitted, as is discussed further below.

Figure 8:
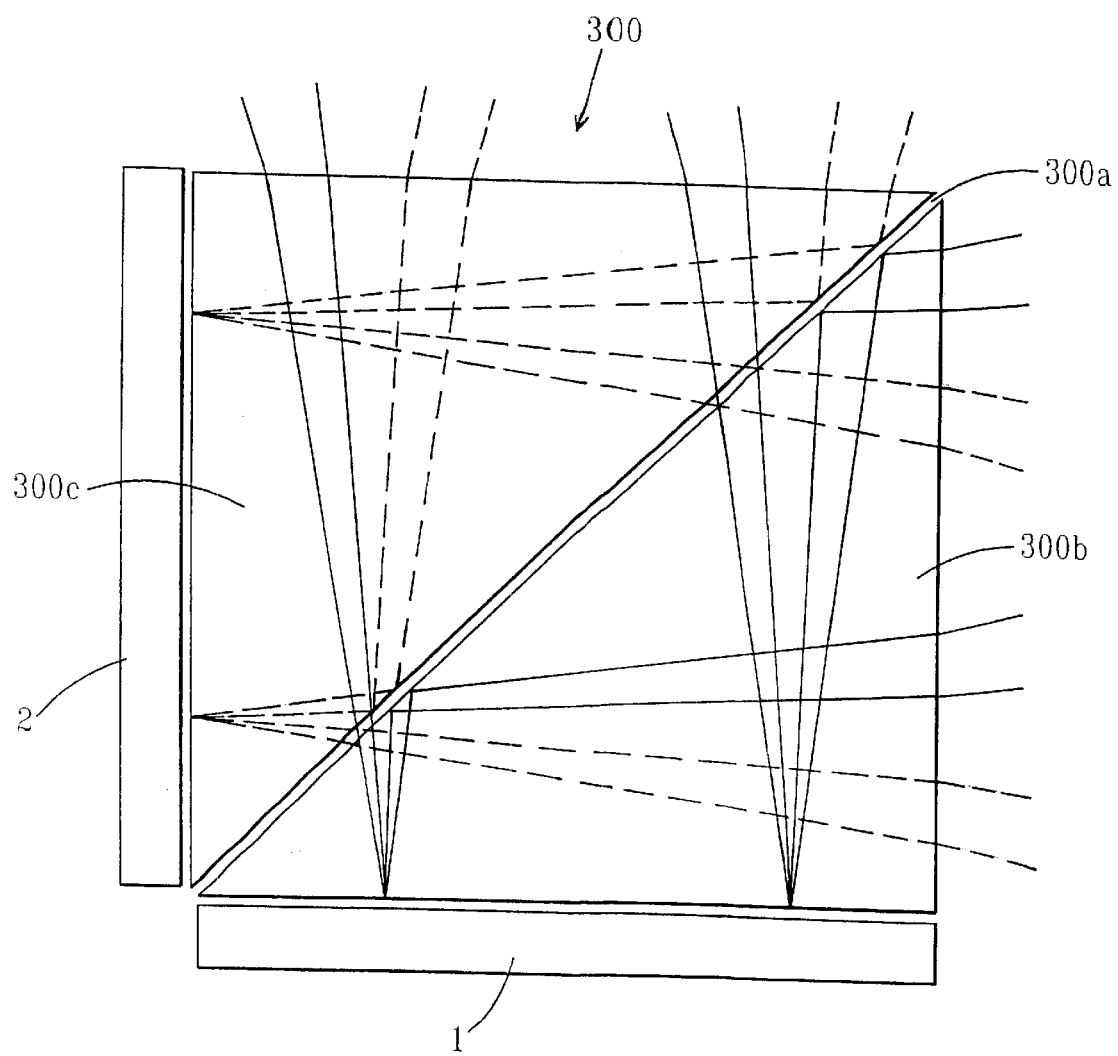
FIG. 8 illustrates the operation of the total internal reflection prism arrangement used in a preferred embodiment of the projection display of the present invention.

Referring now to FIG. 8, the process previously described with regard to the TIR is shown in more detail. Rays that are incident from the upper side of the pupil (shown solid) are completely reflected at an interface 300a, and are thus directed to lightvalve 1 at the bottom face of the right TIR prism 300b. After reflecting from this lightvalve 1, the rays (still shown solid) are returned to the air gap 300a at angles less glancing than critical, and are therefore transmitted across the air gap 300a through the left TIR prism 300c. Dark state light is removed with a post polarizer 616, and bright state light is imaged to the screen by a projection lens (not shown).

Light in the illuminating beam that is incident at angles shallower than critical (shown dashed in FIG. 8) is transmitted through both TIR prisms 300b, 300c to illuminate lightvalve 2 at left. After reflecting from this lightvalve these rays are returned to the air gap 300a at angles more glancing than critical, causing them to be reflected into the output path together with the rays from the first lightvalve. Only rays illuminating two points on each lightvalve are shown in FIG. 8; similar cones of rays are incident at every point in the active area of the lightvalves 1,2.

An important efficiency consideration in the optical system illustrated in FIG. 6 is that the AR coatings on the TIR prisms transmit nearly all of the illumination that is incident at angles less glancing than critical. Thus, the AR coatings would ideally exhibit an infinitely sharp transition at $\theta_{crit}$, transmitting all light at incidence angles less than critical (measured relative to the surface normal) while completely reflecting more steeply incident light. In practice, there will inevitably be a small range of angles which show low transmittance despite being below critical. In order to achieve high coating transmission over most sub-critical angles in the pupil it is better to sacrifice reflectivity over a small range of angles adjacent to $\theta_{crit}$. This can partly be compensated by a shift within the pupil of the focussed arc images.

FIG. 9 shows tabular values for a coating designed for high transmittance through K10 glass at incidence angles below 40.5°. Calculated reflectance is shown in FIG. 10. The critical angle $\theta_{crit}$ is about 41.7°. Letting $\theta_{max}$ denote the steepest angle at which the AR coating is considered to function well (about 40.5° in this case), the pupil can be said to exhibit a deadband between $\theta_{max}$ and $\theta_{crit}$ (amounting to about 1.5° in this example). The prism angles should be chosen so as to put the central ray at the geometric mean angle of this deadband (about 41°), i.e. the prism base angle should be slightly shifted from $\theta_{crit}$. Ideally $\theta_{crit}$ should not vary with wavelength; K-10 glass is a suitable substrate glass because of its low dispersion.

While the invention has been particularly shown and described with respect to illustrative and preferred embodiments thereof, it will be understood by those skilled in the art that the foregoing and other changes in form and details may be made therein without departing from the spirit and scope of the invention which should be limited only by the scope of the appended claims.

Having thus described our invention, what we claim as new, and desire to secure by letters patent is:

1. A projection display for displaying a color image formed of a plurality of color pixels, each color pixel comprising a combination of different colored sub-pixel components, the display comprising:
   a light source for supplying white unpolarized light to an optical path,
   a projection lens disposed in the optical path,
   first and second light valves disposed in the optical path, the first and second light valves each having a plurality of sub-pixels, each sub-pixel having an associated color filter element that passes to the sub-pixel a single fixed color component from the illuminating white light, and wherein the sub-pixels are grouped into groups of three, each group comprising a single sub-pixel from one of the first or second light valves that is overlapped with two adjacent but not overlapped sub-pixels from the other light valve, which together combine to form a color pixel of the color image for each of the color pixels of the color image, and
   directing means for directing the light from the white light source to the first and second light valves and for directing the respective color light components reflected from the light valves towards the projection lens which projects and magnifies the color pixels onto a screen thereby forming the color image.

2. The display of claim 1, further comprising:
   separating means disposed in the optical path for separating light having first and second polarizations from the unpolarized light and for directing the light having the first and second polarizations each along a separate optical path, and
   converting means disposed in the optical path of the light of the first polarization for converting the light of the first polarization into light of the second polarization for direction towards the directing means.

3. The display of claim 2, wherein the directing means comprises a total internal reflection prism arrangement whereby light incident upon the total internal reflection prism at an angle less than a critical angle is transmitted to one of the first or second light valves and light incident upon the total internal reflection prism at an angle greater than the critical angle is reflected towards the other of the first or second light valves.

4. The display of claim 2, wherein the separating means comprises a polarization beamsplitter having a polarizing coating which transmits light of one of the first or second polarizations and transmits the other.

5. The display of claim 2, wherein the converting means comprises a half-wave retarder for converting the light of the first polarization into light of the second polarization.

6. The display of claim 1, wherein each group of three subpixels comprises a sub-pixel having a red filter, a sub-pixel having a green filter, and a sub-pixel having a blue filter.

7. The display of claim 6, wherein the single sub-pixel comprising each group of three sub-pixels has the green filter and the remaining two sub-pixels have the red and blue filters.

8. The display of claim 7, wherein the green subpixel is substantially centered over the red and blue sub-pixels when projected onto the screen.

9. The display of claim 8, wherein the sub-pixels are rectangular and have a height 1.5 times their width.

10. The display of claim 1, further comprising distribution means for distributing sub-pixel data between the first and second light valves.

11. The display of claim 10, wherein the distribution means comprises a buffering means for buffering the sub-pixel data from two pixels at a time.

12. The display of claim 11, wherein the buffering means comprises:
   a processor for generating pixel data for displaying the image and separating the pixel data into groups of sub-pixel data,
   grouping means for grouping the sub-pixel data into groups of two, and a clock for directing each two group sub-pixel data to their respective light valves and for accepting the next set of two group sub-pixel data.

13. The display of claim 12, wherein the grouping means comprises a memory buffer for storing the two group sub-pixel data, and wherein the clock prompts the direction of the two group sub-pixel data from the buffer to their respective light valves and prompts the acceptance of the next set of two group sub-pixel data into the buffer.

14. A method for displaying a color image with a projection display, the color image formed of a plurality of color pixels, each different colored pixel comprising a combination of different color light components, the projection display comprising a white light source, a projection lens, directing means, and first and second light valves each having a plurality of sub-pixels, each sub-pixel having an associated color filter element that passes to the sub-pixel a single fixed color component from the illuminating white light towards the directing means, and wherein the sub-pixels are projected in groups of three, each group comprising a single sub-pixel from one of the first or second light valves that is overlapped with two adjacent but not overlapped sub-pixels from the other light valve, the method comprising the steps of:

(a) supplying white light from the light source, (b) directing the white light by means of the directing means towards the first and second light valves, (c) directing the respective color light components reflected from the light valves by means of the directing means towards the projection lens, (d) projecting and magnifying each color light component of the single sub-pixel onto a screen, and (e) simultaneously projecting and magnifying the color light components of each of the remaining two sub-pixels onto the screen to combine each single sub-pixel with its corresponding remaining two sub-pixels to form the color pixels of the color image.

15. The method of claim 14, further comprising the steps of:

separating light, by means of separating means disposed in the optical path, having first and second polarizations from the unpolarized light and directing the light having the first and second polarizations each along a separate optical path, and converting the light of the first polarization, by means of converting means disposed in the optical path of the light of the first polarization, into light of the second polarization for direction towards the directing means.

16. The method of claim 15, wherein the directing means comprises a total internal reflection prism arrangement whereby light incident upon the total internal reflection prism at an angle less than a critical angle is transmitted to one of the first or second light valves and light incident upon the total internal reflection prism at an angle greater than the critical angle is reflected towards the other of the first or second light valves.

17. The method of claim 15, wherein the separating means comprises a polarization beamsplitter having a polarizing coating which transmits light of one of the first or second polarizations and transmits the other.

18. The method of claim 15, wherein the converting means comprises a half-wave retarder for converting the light of the first polarization into light of the second polarization.

19. The method of claim 14, wherein each group of three sub-pixels comprises a sub-pixel having a red filter, a sub-pixel having a green filter, and a sub-pixel having a blue filter.

20. The method of claim 19, wherein the single sub-pixel comprising each group of three sub-pixels has the green filter and the remaining two sub-pixels have the red and blue filters.

21. The method of claim 20, wherein the green subpixel is substantially centered over the red and blue sub-pixels when projected onto the screen.

22. The method of claim 21, wherein the sub-pixels are rectangular and have a height 1.5 times their width.

23. The method of claim 14, further comprising the step of distributing sub-pixel data by means of a distribution means between the first and second light valves.

24. The method of claim 23, wherein the distribution means comprises a buffering means for buffering the sub-pixel data from two pixels at a time.

25. The method of claim 24, wherein the buffering means comprises:

a processor for generating pixel data for displaying the image and separating the pixel data into groups of sub-pixel data, grouping means for grouping the sub-pixel data into groups of two, and a clock for directing each two group sub-pixel data to their respective light valves and for accepting the next set of two group sub-pixel data.

26. The method of claim 25, wherein the grouping means comprises a memory buffer for storing the two group sub-pixel data, and wherein the clock prompts the direction of the two group sub-pixel data from the buffer to their respective light valves and prompts the acceptance of the next set of two group sub-pixel data into the buffer.

* * * * *